No. 626,832. Patented June 13, 1899.
E. S. HALSEY.
ELECTRIC METER.
(Application filed May 23, 1898.)
(No Model.) 3 Sheets—Sheet 1.
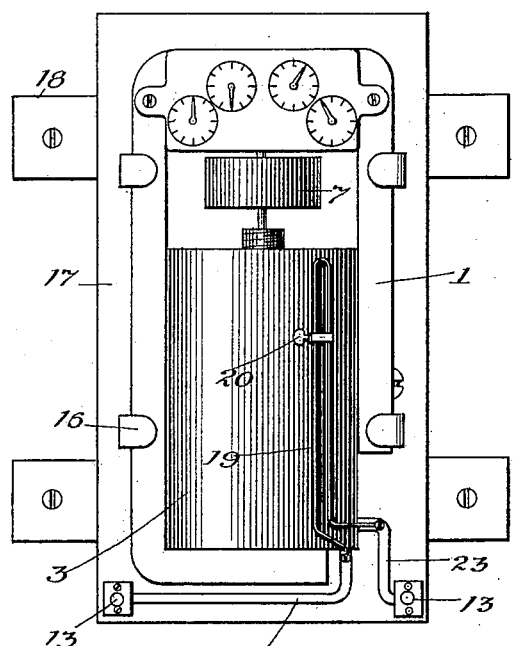
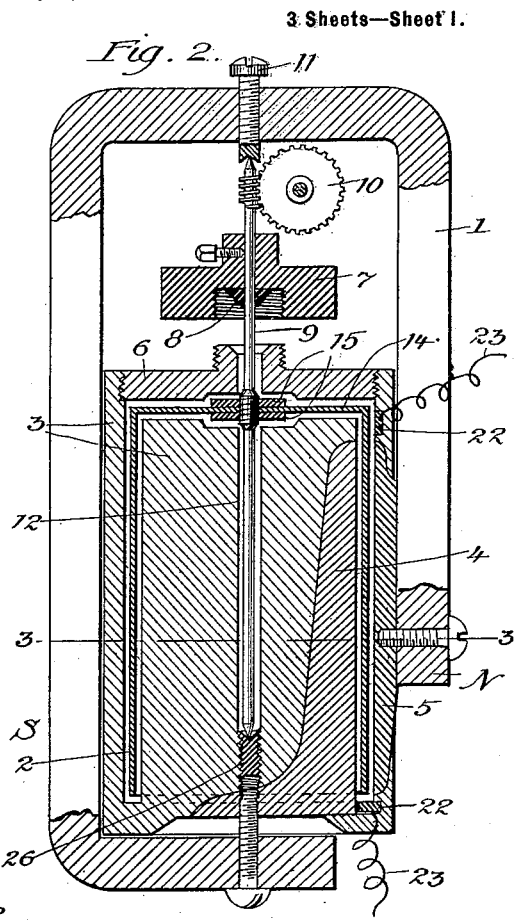
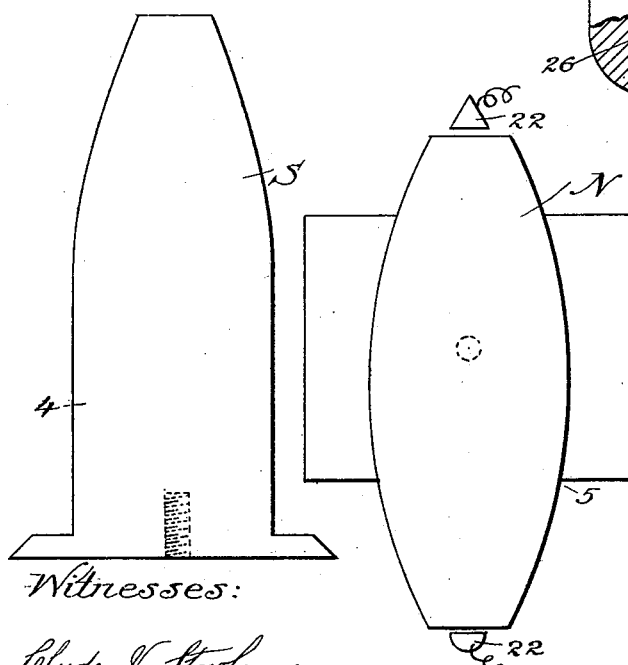
Witnesses:
Clyde V. Strohm
Philip C. Reidy
Inventor:
Edward S. Halsey

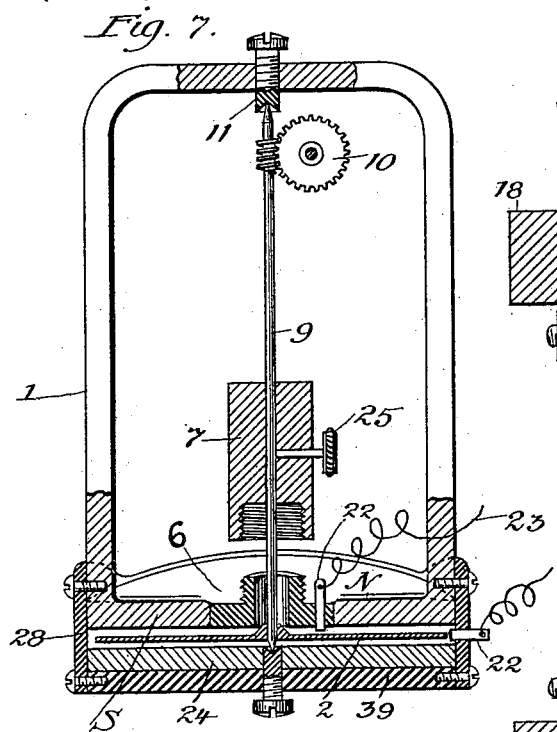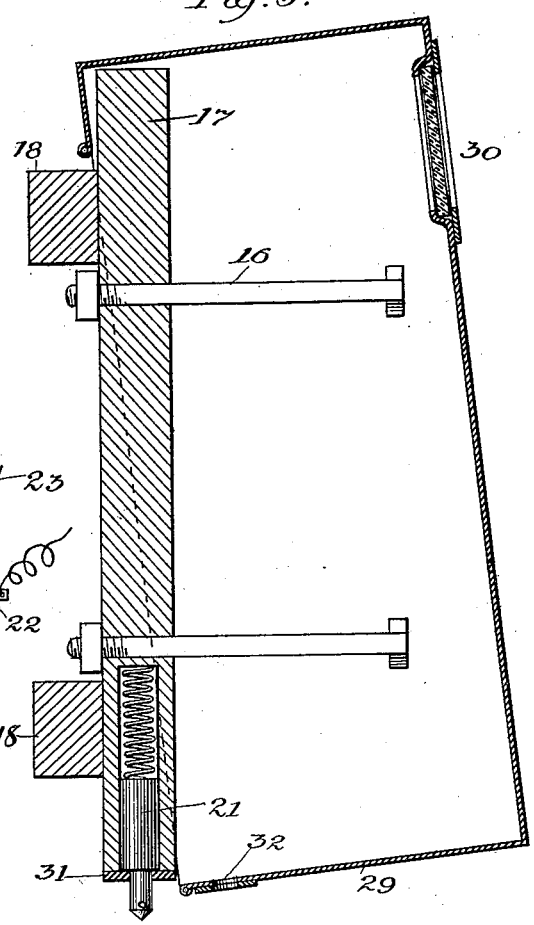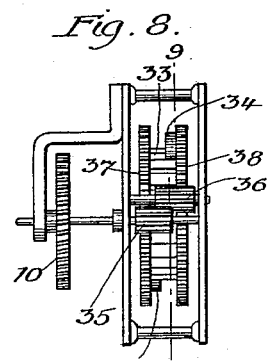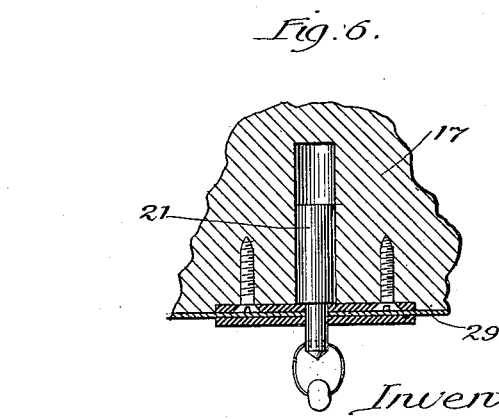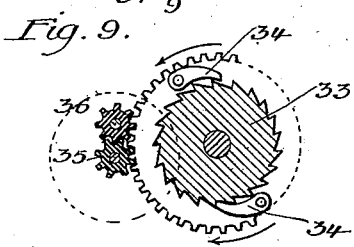

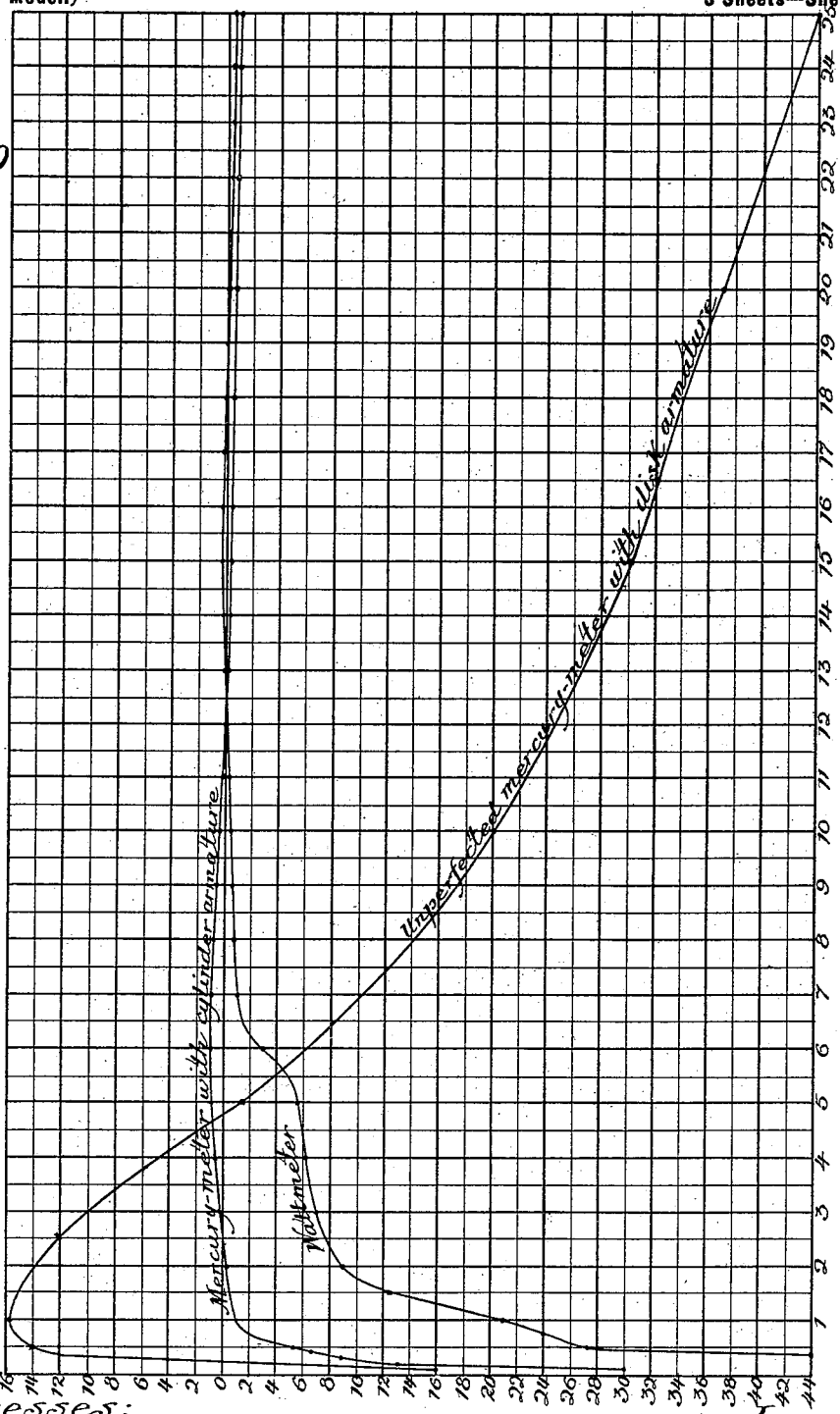

UNITED STATES PATENT OFFICE.

EDWARD S. HALSEY, OF CHICAGO, ILLINOIS.

ELECTRIC METER.

SPECIFICATION forming part of Letters Patent No. 626,832, dated June 13, 1899.

Application filed May 23, 1898. Serial No. 681,451. (No model.)

*To all whom it may concern:*

Be it known that I, EDWARD S. HALSEY, a citizen of the United States, residing at Chicago, in the county of Cook and State of Illinois, have invented a new and useful Electric Meter, of which the following is a specification.

My invention relates to a recording electric-current meter of a mercury-motor type; and the objects of my invention are, first, to make a meter of wider range for a given capacity and of greatest accuracy throughout its extreme range; second, to make it of very few parts, thereby reducing the manufacturing expense and liability to disorder; third, convenience of handling and operating, with compactness and lightness.

My invention consists of a set of wheel-train counters driven by a small motor, through which the current to be measured passes, or a definite part thereof, and the speed of rotation of said motor is in direct keeping with the amount of current passing through it. The motor consists of a constant magnetic field, preferably that of a permanent magnet. In this field rotates an armature consisting of a continuous piece of copper about one-sixteenth inch in thickness and carried by a vertical shaft, which is geared through a worm to the recording mechanism at its upper end. But a small part of the armature lies within the magnetic field at one time. The current is led to the armature by two small electrodes that dip into the mercury in which the armature is submerged at opposite borders of the field, so that the current will have to travel the whole length of the field.

In the accompanying drawings, which illustrate my invention, similar letters and numerals refer to similar parts throughout the several views.

Figure 1 is a view of completed meter with cover removed. Fig. 2 is a sectional view through center from the same position as in Fig. 1. Fig. 3 is another section of the same, looking down from the top. Fig. 4 shows the two pole-pieces, being of iron castings to be molded into the composition body of the meter. Fig. 5 is a sectional view of the backboard and cover, looking at it sidewise. Fig. 6 is a sectional view of a small fraction of the lower part of the backboard and cover from the front, showing the cover-latch applied. Fig. 7 is a sectional and partial perspective view of another design of a meter introduced to illustrate how some of the principles of my invention can be applied to different forms. Fig. 8 shows an edgewise view of a differential gear forming a part of the recording mechanism. Fig. 9 gives an introspection of the relative positions and workings of the essential parts of the gear referred to from the front side. Fig. 10 is a diagram showing characteristic curves.

Having briefly described my invention, I now proceed to describe it in full.

The construction of my meter will best be understood from the sectional views Figs. 2 and 3, and consists, mainly, of three parts— first, the permanent magnet 1, forming a strong field in the narrow gap between its pole-pieces 4 and 5; second, the armature, consisting of a copper cylinder 2 two and one-fourth inches in diameter and about twice its diameter in length and about one-sixteenth of an inch in thickness. This armature is carried by a vertical steel shaft 9 through the medium of the spider 14, (shown as a transparency by dotted lines in Fig. 3,) which is adjusted to shaft by the hexagon nuts 15. The armature is adjusted in its bearings to rotate freely between the pole-pieces in the magnetic field. It is wholly submerged in mercury, which is contained in a circular slot in the third prominent part 3, which is the main body of the meter and acts as a receptacle for the mercury and armature. The aforesaid slot is of uniform width, only sufficient for the armature to revolve freely. The inside pole-piece 4 and the outside pole-piece 5 present convex and concave surfaces, respectively, to the walls of the slot of which they form a part, being treated with an insulating-surface. The body or cup 3 is pressed out of a mass of insulating material, and into it are formed the pole-pieces and the two copper electrodes 22 and 22. The pole-pieces each present a flat surface of considerable area to the magnet and have at the centers of said surfaces screw-holes for means of securing them to the magnet, which in turn is clamped to the backboard. The pole-pieces being thoroughly embedded in the mass of body give to it sufficient rigidity.

Straight through the axis of the cylindrical body is hole 12. At the bottom it passes through the foot of pole-piece 4 and is tapped out for the anchor-screw, which holds it to the magnet. This hole is a pit for the bottom bearing 26, which is screwed into place from the bottom. The hole is large enough for the shaft to turn freely and is filled with mercury.

The top of the receptacle is fitted with a cover 6, of composition, having an opening at its center in the form of a neck threaded on the outside, out of which passes the shaft, which carries a ballast-weight 7, having a threaded cavity on its under side fitted with a rubber gasket 8. The weight is adjustable on the shaft, so as to be lowered and screwed onto the neck of the cover, clamping the gasket, and thereby making the receptacle mercury-tight and locking the meter, so as to stand transportation.

The main function of ballast-weight is to compensate the buoyancy of the copper armature floating in the mercury, which is of greater specific gravity. The top of shaft is fitted with a worm to engage a gear-wheel 10, contained in recording mechanism. The magnet surrounds and incloses the other parts, thereby making the whole arrangement very compact, and also acts as a frame for supporting the top bearing and recording mechanism.

The cavity within the composition body is shaped to resemble the armature and fitted as close as is consistent with the free rotation of same, thereby leaving as little idle space as possible to be filled up with mercury.

The positive and negative electrodes 22 and 22 are of copper and present to the mercury as small an area as is consistent with the required conductivity and are centrally located close to the end of the outer pole-piece 5 and are embedded in the composition of body and lead out through its walls at convenient points for connection with conductors 23 and 23, (the one from the top passing behind body,) which lead to the meter binding-posts 13 and 13. (Shown in Fig. 1.)

It is to be understood that the chamber of body is completely filled with mercury well up into the neck and that the current to be measured is led from one electrode across a very short distance by the mercury to one extremity of the armature, through which the greater part of the current passes directly through the center of the constant concentrated and powerful field, passing out through the mercury and the other electrode at the other end. The pole-pieces are narrow at the ends and wider in the middle to take in a greater number of current-lines, which naturally diverge toward the center as they pass from one electrode to another. Since the conductivity of the copper armature is nearly one hundred times greater than that of the mercury, it is obvious that the greater and a definite part of the current will pass through the armature.

The chief characteristics of my invention and meter are three—first, the peculiar nature of the magnetic field; second, the cylinder-armature, with a length considerably greater than its diameter; third, the electrodes 22 and 22, limited to a small spot, and their respective relations to other parts. One of the peculiarities of my meters is the fact that if the field through which the current is passed be weakened the speed will increase, with the reversed effect if strengthened.

I effect a regulation of my meter by means of a shunt 19 being connected by screws to the armature-leads 23 and 23, having means of regulating its conductivity by the sliding jumper 20. In the smallest size this shunt will have its resistance proportionated so as to take from the armature only sufficient current to effect the desired correction, but in the larger sizes may have a conductivity sufficient to take a large and definite part of the current to be measured, thereby increasing the capacity of the meter according to the size of shunt; but I prefer to accomplish increased meter capacity by using a conductor of low resistance to be concealed in back of meter (but is not shown) and connected in shunt with armature-circuit and small regulating-shunt.

The third sheet of drawings is a diagram presenting the characteristic curves of three different meters, each being respectively marked on the diagram, so as to be easily distinguished from the others. The first is the curved line described by my perfected meter with cylinder-armature, as shown in the accompanying drawings. The column of figures from top to bottom of diagram give the per cent. fast or slow from the starting-point to point of full load, as shown by the ampere-scale at bottom of diagram.

Although my meter will run constantly on one-twentieth part of an ampere, it runs so slowly and uniformly I have not attempted to show it. At the same time it is obvious that it is impossible for it to run on no load. As will be seen from diagram, it has not an extreme error at one-tenth of an ampere and constantly improves until at two and one-half amperes it is correct and continues to rise until at about one-fourth load it is one per cent. fast. From here it declines until at about one-half load it again become correct, and still further it drops to one per cent. slow at its limit. Another of the curves shown is that of a recording-wattmeter, this being the only class of motor-meters in common use in America for the sale of direct-current electricity. It being obvious that this is the class of work my meter is intended for, and one of the main objects of my invention being to make a meter more accurate throughout its load, and especially at very small loads, without danger of running on no load, I think it proper to present a comparison of the results of my own with that of those now in common use.

Finally, upon careful verification I think my curve comparisons herewith given will be found very reasonable and impartial, and, further, that in carrying out my invention I have produced a meter giving decidedly better results than any now in use for this class of work.

For the purpose of showing the deterring influence of mercury contended with and to give some idea of how large a part of the drag it constitutes I have introduced a curve described by one of the meters over which I labored in my early experiments. The armature was the disk type and the field was of a considerable strength, sufficient to make the armature revolve with certainty on one-tenth of an ampere. Although the field was arranged to give a drag effect, still it was not of sufficient strength and not concentrated or arranged so as to get its maximum drag effect, in which case it could have been made to show a great deal more consistent curve than the one shown on the diagram with an extreme variation of sixty per cent. In the second sheet of drawings, Fig. 7 is a sectional and partial perspective view of a mercury-meter with a copper disk armature 2, showing its section through the center, being supported by the vertical shaft 9, revolving on point-bearings, the disk revolving in a thin circular chamber, with only sufficient room for it to move freely and the surrounding space filled with mercury up into the neck-opening left in the lid 6 for the introduction of the shaft, said lid or cover of insulating material also having embedded and passing through it the two magnet extremities or pole-pieces N and S, also the upper electrode 22, centrally located, so as to make connection by the disk and mercury through the heart of the field to the other electrode 22, entering by the side. The bottom in form is an insulating-plate having embedded in it a strip of soft iron extending across its center, serving to complete the magnetic circuit leading from one pole to another. The circular top and bottom parts are bound and held together by a band of insulating material 28, forming the outer wall for the mercury-chamber. The shaft carries the ballast-weight 7, performing the same duty as in Fig. 1, and is clamped to shaft by the thumb-screw.

Fig. 5 shows a sectional view looking from one side of backboard 17, cleats 18 and 18 acting at once as stiffness for backboard, support for meter, and back-stops for cover 29. There are four anchor-bolts 16, fitted at one end with a nut and at the other with a claw for grasping the magnet, to which all other parts are fastened, and clamping it to the backboard. The cover 29 completely envelops all sides except the back and is fitted with window 30 at the registering-dial and has a small round hole 32 at the bottom to fit the bolt 21 and is reinforced by a small metal plate at that point with a hole of the same size. The bolt 21 is in a hole bored in the center of bottom of backboard, in which it moves freely and may fall of its own weight, as shown in Fig. 6, or may be pushed by a small coil-spring placed in the hole back of it. The lower section of bolt is cut down to a smaller size, thereby making a shoulder, which rests against plate 31, with a hole in its center, and acts as a retaining-stop for bolt and is countersunk in bottom of board and held by two screws. The lower end of bolt is conical in shape to facilitate its passage through the holes. In the bottom extremity of bolt is drilled a small hole for the introduction of a seal-wire, as shown in Fig. 6. The cover is adapted to backboard by an overhanging edge at top of cover, being lowered until it engages the top of backboard. Then the bottom of cover is pushed back until its sides strike the ends of the cleats, when the bolt which has simultaneously been lifted by the finger will drop into place through the hole in the cover, and is thereby latched ready for sealing.

It at once becomes apparent that the direction of rotation of my meter depends on the polarity of the current introduced and upon the direction in which it is carried through it; but in any case the meter would give a uniform result. Therefore to obviate the necessity of the workmen testing the wires for polarity and service and, further, to guard against all possible harm from the reversal of the polarity I have invented the differential gear, (shown in Figs. 8 and 9,) which is so constructed as to drive the ratchet-wheel 33 and in turn the recorders, which are not shown, but are to be geared to it, in a forward direction, regardless of the direction taken by armature and intermediate parts. On both sides of ratchet-wheel are similar spur-wheels 37 and 38, each having a similar pawl 34 and 34, so arranged as to become engaged with the ratchet-wheel. Both spur-wheels run loose on the shaft to which the ratchet-wheel is fixed and one is always driven in the opposite direction from the other, the one taking the forward direction engaging the ratchet-wheel by means of its pawl and driving it and the attached recorders always forward, while the other spur-wheel runs in the opposite direction, dragging its pawl idly over the ratchets. The spur-wheels 37 and 38 are driven in directions opposite to one another by means of the pinion-wheels 35 and 36, with which they are respectively meshed. Pinion-wheel 35, being fixed to the shaft of worm-wheel 10, must travel in the direction determined thereby, and, being also meshed with pinion-wheel 36, must develop therein a direction opposite to its own. It is obvious that this gear could be differently constructed without altering the effect of the invention. For instance, instead of the common ratchet-wheel each pawl might be fitted to an independent ratchet-wheel. I am aware that there have been mercury-meters in use for some time in which the mercury itself acts as the armature and in which there is no magnetic drag, a consistency of rotation being effected by means of an increasing field produced by series of windings.

I am aware that since I have labored with this invention another has invented a meter with a supplementary drag-disk and a decreasing drag-field by means of series windings. I am also aware that others have attempted to construct a practical meter with a cup-armature and an enormous permanent magnet-field, the currents being fed at the center of bowl of cup and taken away at all points of the brim. I am not aware, however, that any attempts have been made to use a cylindrical armature of a considerable length or a concentrated or elongated magnetic field, or with the current led in by small electrodes centrally located at both ends of the pole-piece, or of a general similar construction to the one shown and claimed by me.

What I claim, and beg for protection in Letters Patent, is—

1. In a mercurial electric-current meter; a body of non-magnetic material containing the mercury and armature, and having molded or formed into its walls pole-pieces N and S; in combination with a constant, concentrated and powerful magnetic field so proportioned and applied as to determine to the armature a speed of rotation practically in direct proportion to the current passing at various loads, in spite of the deterring influences of the mercury and unavoidable friction, regardless of any compensating device or influence; substantially as shown and specified.

2. The combination in a mercurial electric-current meter; a mercury-chamber being a narrow slot in a body made of non-magnetic material in greater part; magnetic poles N and S entering to said chamber by its walls being fixed therein and defining thereby a magnetic field in said slot of small area compared to the area of the chamber of which it is a part; electrodes 22 and 22 entering said chamber through its walls by which they are held in position, being one at each end of said field centrally located thereto and of small area so as to direct the current between said poles and through the center of said field; an armature of sheet metal adapted to fit said chamber in which it rotates submerged in mercury and is propelled by the current led to it by said electrodes and is retarded by the magnetic field in which it rotates, substantially as shown and specified.

3. In a mercurial electric-current meter pole-pieces presenting to each other surfaces widest at their centers and tapering toward the ends so as to establish in the slot between them a magnetic field broadest at the center and narrowing toward the ends; said pole-pieces being of small area compared to armature 2 rotating between them and small electrodes centrally located at each end of said pole-pieces as shown and for the purpose specified.

4. In a mercurial electric-current meter a body or receptacle containing and enveloping the submerged rotating armature and being formed or pressed from non-magnetic material embracing and holding in their fixed positions the magnetic pole-pieces S and N and electrodes 22 and 22 the top portion 6 of the body having at its center an opening for the introduction of the armature-shaft.

5. In a mercurial electric-current meter a body or receptacle 3 being of insulating material pressed or molded around the pole-pieces 4 and 5 and the electrodes 22 and 22 holding them in their respective places.

6. In a mercurial electric-current meter a body or receptacle consisting of the lower part 3 and the upper part 6 adapted to fit each other with a mercury-tight joint, and embracing the pole-pieces N and S and electrodes 22 and 22 and adapted to a stopper to close mercury-tight the opening around the shaft in the top, when transported.

7. In a mercurial electric-current meter a receptacle 3 containing the mercury and surrounding the armature in combination with the magnet 1 so formed and placed that it shall inclose the receptacle and armature directing its lines of force through them; for the purposes, and as shown and specified.

8. In a mercurial electric meter; an armature-circuit consisting of an armature submerged in mercury, conductors leading the current to and from the mercury and armature so that it will pass through the armature in going from one of said conductors to the other; said armature-circuit to be connected in shunt to another circuit containing an adjustable resistance, by means of which the speed of the meter shall be corrected.

9. In a mercurial electric-current meter means of adjusting the speed of rotation consisting of the shunt 19 and the sliding jumper 20 of so high a resistance as to take from armature but sufficient current for means of correction, substantially as specified.

10. The ballast-weight 7 carried by the shaft 9 and serving to submerge the armature when released and being adapted to be lowered locking and closing mercury-tight the opening in the cover 6 when required for transportation.

11. In a mercurial electric meter, a part 7 carried by the shaft 9 when in operation and being threaded at its lower end so as to be screwed to the threaded neck on cover 6, thereby effectually sealing and locking meter for transportation.

12. In a recording electric meter having a rotating armature; a differential gear driving a single recording mechanism always in a given direction regardless of the direction of rotation of the driving-shaft, and consisting of the driven ratchet-wheel 33, spur-wheels 37 and 38 having a common shaft and pawls 34 and 34 and driven in directions opposite to each other by the pinion-wheels 35 and 36 respectively; as shown and specified.

13. The combination in a housing for a recording electric meter of the part 17 serving at once as back of housing and support for meter; with the cover 29 covering all other sides and being adapted to back, by being lowered a short distance whereby they shall become engaged at the top, then in turn the bottom of cover 29, after being thrown back square with the back part 17, will be locked, at bottom, to it, substantially as shown and specified.

14. In a recording electric meter the bolt 21 held by bottom portion of meter back and being adapted to drop through an opening in bottom of cover thereby locking cover in place, substantially as shown and specified.

In testimony that I claim the above I hereunto set my hand this 21st day of May, 1898.

EDWARD S. HALSEY.

In presence of—
CLYDE V. STROHM,
PHILIP C. REIDY.